MAGNETIC MEMORY WITH AN OFF-SET BIT LINE
TO REDUCE CAPACITANCE COUPLING

Filed July 2, 1965

INVENTORS
WOLODYMYR LUCIW
WILLIAM E. FLANNERY

BY [signature]

ATTORNEY

United States Patent Office 3,466,623

Patented Sept. 9, 1969

3,466,623

MAGNETIC MEMORY WITH AN OFF-SET BIT LINE TO REDUCE CAPACITANCE COUPLING

Wolodymyr Luciw, Philadelphia, and William E. Flannery, Norristown, Pa., assignors to Sperry Rand Corporation, New York, N.Y., a corporation of Delaware Filed July 2, 1965, Ser. No. 469,207

Int. Cl. G11b 5/00

U.S. Cl. 340—174 5 Claims

ABSTRACT OF THE DISCLOSURE

This invention relates to a memory which utilizes a bit coupling for a thin film element which comprises using a single line which is off-set from the single sense line. By this arrangement, the capacitance coupling between elements is greatly reduced. This minimizes voltage transient from being coupled from the bit to the sense line during the write cycle and prevents the sense amplifier from being saturated.

This invention relates to magnetic memory circuitry and, in particular, to wires associated with thin magnetic film elements.

Conventional, destructive-readout, thin film magnetic memories, of the type having thin film elements in a matrix arrangement, utilize sets of orthogonal windings having their intersections at the thin film storage element locations. A word or drive winding is oriented parallel to the easy axis of the thin film storage elements, whereas the bit and sense windings are oriented parallel to the hard axis of the elements. The geometry for a single bit of a conventional destructive readout memory is such that the windings for the bit-line and sense-line have maximum inductive and capacitive coupling so that, during a write portion of a cycle, a current pulse on the bit-line couples strongly to the sense-line thereby causing a large voltage transient to appear at its associated sense amplifier input. This transient saturates the amplifier. The time required for the amplifier to recover from saturation adds to the memory cycle time. In order to obtain shorter cycle times, the bit current transient should be greatly reduced. Thus, to overcome such disadvantage, a pair of bit and sense cancellation lines have been required for each storage element. A differential amplifier is connected to the sense and cancellation-sense lines. Since the differential amplifier rejects the common mode unwanted signal, only the output from the storage element is amplified. The disadvantage of such an arrangement is that the introduction of a cancellation-sense line reduces the packing density of the memory plane; also, it is necessary to provide a differential amplifier with satisfactory common mode rejection at high frequency.

Thus, it is an object of this invention to provide novel magnetic circuitry which obviates the requirement for a differential amplifier.

Still another object of this invention is to provide novel magnetic circuitry requiring fewer lines for coupling to a film element.

Yet another object of this invention is to provide novel magnetic circuitry suitable for increasing the packing density of a memory plane.

Yet another object of this invention is to provide novel magnetic circuitry suitable for use at high frequencies.

Still yet another object of this invention is to provide novel magnetic circuitry which reduces bit-to-sense line coupling.

In accordance with one embodiment of this invention, a planar substrate has a thin anisotropic magnetic film element deposited thereon with its easy axis of magnetization aligned in a preferred direction. A sense line is placed directly above the thin film element parallel to the substrate and parallel to the hard axis of the film. Above the sense line, and orthogonal therewith, a drive or word line is coupled parallel to the easy axis of the film. A bit line is coupled above the word line and orthogonal therewith, whereby the bit line is parallel to the sense line. The bit line is displaced away from the sense line, a distance along the easy axis, so that, when carrying a current therethrough, write field is created having a perpendicular component to the film element. The resultant write field generated by the bit line enables the film to be switched.

Other objects and advantages of this invention, together with its construction and mode of operation, will become more apparent from the following description, when read in conjunction with the accompanying drawing in which.

Figure 1:
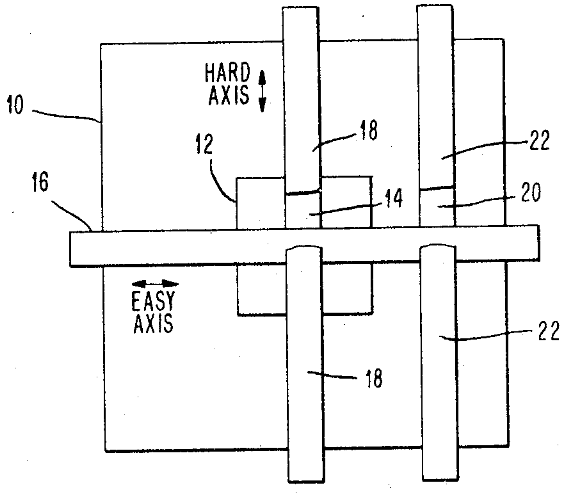
FIG. 1 PRIOR ART
FIG. 1 is a top view, partly in cross-section, of a magnetic circuitry device of the prior art.
Figure 2:
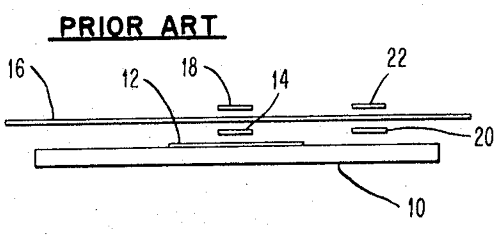
FIG. 2 PRIOR ART
FIG. 2 is an elevational view of the prior art device shown in FIG. 1.

The following description of a prior art device is given in order to fully understand the concepts and teachings of this invention. Referring to FIGS. 1 and 2, there is shown a substrate 10 having a thin anisotropic magnetic film element 12 deposited thereon. The magnetic film element 12 has an easy axis of magnetization lying in the plane of the film and is illustrated, arbitrarily, in FIG. 1 as being towards the right. A sense line 14, parallel to the hard axis of the film 12, is located directly above the film 12. The hard axis of the film lies in the plane of the film 12, perpendicular to the easy axis. Directly above the sense line 14, and orthogonal therewith, is a word or drive line 16. The word line 16 is parallel to the easy axis of the film element 12. A bit line 18, above the word line 16 and orthogonal therewith is oriented parallel to the sense line 14 and parallel to the hard axis of the film element 12.

The "read" and "write" operations for a conventional destructive-readout magnetic thin film memory are accomplished with the aid of sets of orthogonal windings 14, 18, and 16 having their intersections at storage element locations. The drive winding 16 is parallel to the easy axis of the thin film storage element 12 whereas the bit line 18 and sense winding 14 are parallel to the hard axis of the element 12.

As can be seen from FIGS. 1 and 2 which illustrate the prior art device, the bit winding 18 and the sense winding 14 geometry is such that the windings 18, 14 have maximum inductive and capacitive coupling. During the write portion of a cycle, a current pulse on the bit line 18 couples strongly to the sense line 14 thereby causing a large voltage transient to appear at its associated sense amplifier input (not shown), thereby saturating the amplifier. The time required for the sense amplifier to recover from saturation increases the memory cycle time. In order to provide for shorter time cycle, the bit current transient should be greatly reduced, as, for example, by utilizing a pair of bit and sense cancellation lines for each storage element.

Therefore, as shown in FIGS. 1 and 2, a sense-cancellation line 20 is provided parallel to the sense line 14, displaced laterally of the sense line 14, at substantially the same elevation as the sense line 14 with respect to the substrate 10. A cancellation-bit line 22 is provided parallel to bit line 18 and directly above the cancellation-sense line 20, the cancellation-bit line 22 being at substantially the same elevation as the bit line 18. Thus, a pair of bit-cancellation and sense-cancellation lines 22, 20 is required for each storage element 12. A differential amplifier (not shown) is connected to the sense line 14 and cancellation-sense line 20. Since the differential amplifier rejects the common mode unwanted signal, only the output from the storage element is amplified.

A disadvantage of the aforesaid described device of the prior art is that introduction of cancellation-sense lines reduces the packing density of the memory plane. In addition, it is necessary to obtain a differential amplifier with satisfactory common mode rejection at high frequency. The novel features of the invention, hereinafter described with reference to FIGS. 3 and 4, operate free of the aforesaid disadvantages.

Figure 3:
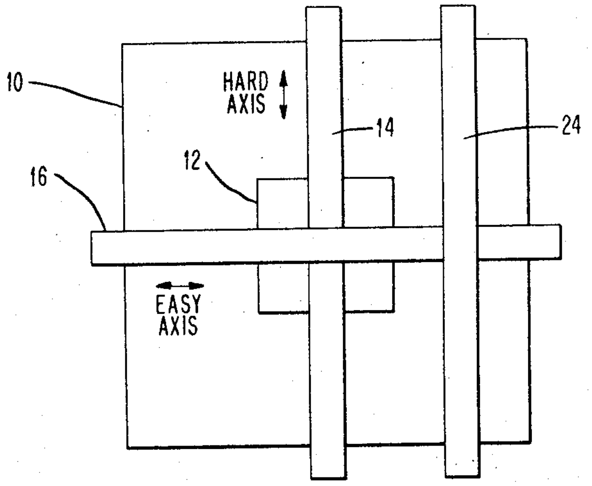
FIG. 3 is a top view, partly in cross-section, of one embodiment of this invention.
Figure 4:
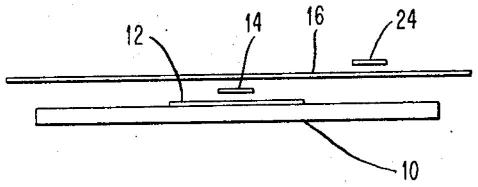
FIG. 4 is an elevational view of the embodiment shown in FIG. 3.

Referring to FIGS. 3 and 4, there is shown a substrate 10 having a planar thin magnetic anisotropic film 12 deposited thereon with its easy axis in the plane of the film oriented horizontal, to the right as illustrated. A sense line 14 is oriented directly above the film element 12, parallel to the hard axis of the film. Orthogonal therewith, and directly above the sense line 14, is a word line 16 which is oriented parallel to the easy axis film, as heretofore. A bit line 24 is coupled directly above the word line 16, and orthogonal therewith, in a position which is laterally displaced of and above the sense line 14.

Accordingly to the embodiment illustrated in FIGS. 3 and 4, a method of memory operation is provided which utilizes a sense line, a bit line, and a word line, obviating the necessity for cancellation lines, and/or differential amplifiers, and the like. Since the method of operation as described with reference to FIGS. 3 and 4, utilizing the sense line, bit line and word line, reduces the bit-to-sense coupling by at least an order of magnitude, a differential-sense amplifier is not required. Reading is performed in the same fashion as previously. Writing is accomplished with a bit current on the bit line 24 which is approximately five times larger than the corresponding bit current on the bit line 18 of the prior art device.

From a physical arrangement of the lines illustrated in FIGS. 3 and 4, a calculated field at the line 14 produced by the current in the line 24 was two orders of magnitude smaller than when a similar current was applied to the line 18 of FIG. 1. Since the bit current used with the new mode of operation, described in regard to the inventive embodiment illustrated in FIGS. 3 and 4, was only five times that used in the old mode of operation, the easy axis bit field was an order of magnitude less than that required for a write operation.

The operation of the film in the new mode is not understood, but has been duplicated many times. It is believed that the principle of operation is based on a precession of the magnetic moment about the normal component of the bit field for the critical instant prior to the moment's return to the easy direction.

Thus, this invention results in storage plane wiring where capacitive and inductive coupling between the sense winding 14 and bit winding 24 is greatly reduced over corresponding conventionally wired storage planes of the prior art.

It is noted specifically that, in the prior art, as shown in FIG. 1, the application of current through the bit line 18 creates a circumferential field about the bit line 18 so that it provides a vector at the film element 12 which is parallel, substantially, to the easy axis of the film.

Referring specifically to the inventive embodiment, illustrated in FIG. 4, it is noted, with emphasis, that the application of bit current through the wire 24 creates a circumferential field about the wire 24. This field, at the magnetic film element 12, has a predominant vertical component together with a small horizontal component. It is believed that this perpendicular component performs some effective synergistic result to enable more effective switching to take place.

The embodiments of the invention in which an exclusive property or privilege is claimed are defined as follows:

1. In combination,
- a planar substrate;
- a thin anisotropic magnetic film deposited on said substrate having its easy axis of magnetization lying in the plane of the film and directed along a preferred axis;
- a sense line coupled to said film, oriented parallel to the hard axis and over said film;
- a word drive line oriented orthogonal to said sense line and lying parallel to the easy axis of said film; and
- a bit line oriented orthogonal to said word line and parallel to the hard axis of said film, said bit line being oriented in a side-by-side relation with said sense line, said bit line being positioned entirely outside the limits of said film.

2. In combination,
- a planar substrate;
- a thin anisotropic magnetic film element deposited on said substrate having its easy axis of magnetization lying in the plane of the element and directed along a preferred axis;
- a sense line coupled to said element, and oriented parallel to the hard axis of said film element;
- a word line oriented orthogonal to said sense line and lying parallel to the easy axis of said film element; and
- a bit line oriented orthogonal to said word line and parallel to the hard axis of said film element and displaced away from said sense line, said bit line being positioned entirely outside the limits of said film element.

3. In combination,
- a planar substrate;
- a thin anisotropic magnetic film deposited on said substrate having its easy axis of magnetization lying in the plane of the film and directed along a preferred axis;
- a sense line coupled to said film, oriented parallel to the hard axis of said film and lying in a plane perpendicular to said film plane;
- a word drive line oriented orthogonal to said sense line, lying parallel to the easy axis of said film, and perpendicular to said sense plane; and
- a bit line oriented orthogonal to said word line and parallel to the hard axis of said film, the bit line lying in a plane perpendicular to said film plane, no portion of said bit plane intersecting said film, said bit line plane being parallel to said sense line plane.

4. The combination as claimed in claim 3 wherein said bit line plane is parallel to, but not coincident with, said sense line plane.

5. The combination comprising
- a planar substrate;
- a thin anisotropic magnetic film deposited on said substrate having its easy axis of magnetization lying in the plane of the film and directed along a preferred axis;
- a sense line coupled to said film element, oriented parallel to the hard axis of said film;

a word drive-line oriented above said sense line and orthogonal therewith, said word line lying parallel to the easy axis of said film;

a bit line lying alongside of said sense line and above said word line, said bit line being orthogonal to said word line, said bit line being further oriented along the side of said film such that any plane through said bit line and perpendicular to said substrate does not intersect said film.

References Cited

UNITED STATES PATENTS

| | | | |
|---|---|---|---|
| 3,159,821 | 12/1964 | Rossing | 340—174 |
| 3,223,985 | 12/1965 | Bittman et al. | 340—174 |
| 3,257,649 | 6/1966 | Dietrich et al. | 340—174 |
| 3,270,327 | 8/1966 | Davis | 340—174 |
| 3,383,665 | 5/1968 | Kashiwagi | 340—174 |

BERNARD KONICK, Primary Examiner

BARRY L. HALEY, Assistant Examiner